(12) United States Patent
Minto et al.

(10) Patent No.: US 10,946,934 B2
(45) Date of Patent: Mar. 16, 2021

(54) ACTUATION DEVICE FOR A CONTROL CABLE FOR A BICYCLE GEARSHIFT

(71) Applicant: Campagnolo S.r.l., Vicenza (IT)

(72) Inventors: Marco Minto, Venice (IT); Christian Marangon, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 15/169,032

(22) Filed: May 31, 2016

(65) Prior Publication Data

US 2016/0355235 A1    Dec. 8, 2016

(30) Foreign Application Priority Data

Jun. 4, 2015   (IT) .............................. UB2015A1309

(51) Int. Cl.
  *B62M 25/04*     (2006.01)
  *B62K 23/06*     (2006.01)
  *B62L 3/02*      (2006.01)
  *B62M 9/124*     (2010.01)

(52) U.S. Cl.
  CPC ............. *B62M 25/04* (2013.01); *B62K 23/06* (2013.01); *B62L 3/02* (2013.01); *B62M 9/124* (2013.01)

(58) Field of Classification Search
  CPC ...... B62M 25/04; B62M 25/02; B62M 9/124; B62K 23/06; B62L 3/02; Y10T 74/20438
  See application file for complete search history.

(56) References Cited

U.S. PATENT DOCUMENTS

| 3,972,247 A | 8/1976 | Armstrong |
| 5,197,927 A | 3/1993 | Patterson |
| 5,787,757 A | 8/1998 | Ozaki |
| 5,921,140 A | 7/1999 | Lemmens |
| 8,061,233 B2 | 11/2011 | Dal Pra et al. |

(Continued)

FOREIGN PATENT DOCUMENTS

| FR | 2657062 A1 | 7/1991 |
| GB | 2 061 468 A | 5/1981 |

(Continued)

OTHER PUBLICATIONS

Italian Search Report and Written Opinion in Italian Application No. IT UB2015A001309, with English translation.

(Continued)

*Primary Examiner* — Daniel D Yabut (74) *Attorney, Agent, or Firm* — Volpe Koenig (57) ABSTRACT

A bicycle control cable actuation device having: a casing, configured for fixing to bicycle handlebars, a cable-winding bush, on which the control cable is wound and which is angularly mobile in the casing about a main axis of the device, an indexing bush that is coaxial to and associated with the cable-winding bush to removably hold the cable-winding bush in predetermined positions that are angularly spaced from each other by predetermined indexing angles, a manoeuvring mechanism, operative on the cable-winding bush to rotate it in a first angular direction about the main axis of the device, to obtain an upward gearshifting; and, a predetermined circumferential clearance corresponding to a predetermined gearshifting extra-stroke angle is provided between the cable-winding bush and the indexing bush.

9 Claims, 11 Drawing Sheets

(56) References Cited

U.S. PATENT DOCUMENTS

| | | | |
|---|---|---|---|
| 2007/0068312 A1* | 3/2007 | Sato | B62K 23/06 |
| | | | 74/502.2 |
| 2012/0318094 A1* | 12/2012 | Fukao | B62K 23/06 |
| | | | 74/502.2 |
| 2015/0101445 A1* | 4/2015 | Lim | B62M 25/04 |
| | | | 74/502.2 |

FOREIGN PATENT DOCUMENTS

| | | |
|---|---|---|
| JP | S59 127127 A | 7/1984 |
| JP | S63 269795 A | 11/1988 |
| JP | H05 32190 A | 2/1993 |
| JP | 2007-039028 A | 2/2007 |

OTHER PUBLICATIONS

European Office Action for Application 16 171 322.7-1755, dated Jan. 2, 2018.

\* cited by examiner

ACTUATION DEVICE FOR A CONTROL CABLE FOR A BICYCLE GEARSHIFT

CROSS REFERENCE TO RELATED APPLICATION

This application claims the benefit of Italian Application No. UB2015A001309, filed on Jun. 4, 2015 and incorporated herein by reference as if fully set forth.

FIELD OF INVENTION

The present invention relates to an actuation device for a control cable for a bicycle gearshift, suitable for being mounted on bicycle handlebars. Preferably, the bicycle is a racing bicycle.

BACKGROUND

A bicycle is normally provided with a rear derailleur associated with the sprocket assembly, which consists of a series of coaxial toothed wheels (sprockets), having different diameters and numbers of teeth, integral with the hub of the rear wheel.

A bicycle is typically also provided with a front derailleur associated with the crankset, which consists of a series of toothed wheels (toothed crowns) having different diameters and numbers of teeth, associated with a pin of the bottom bracket assembly set in rotation by a pair of pedals.

In both cases, the derailleur engages a transmission chain extending in a closed loop between the sprocket assembly and the crankset, moving it on toothed wheels having different diameter and number of teeth, so as to obtain different transmission ratios.

In particular, downward or downhill gearshifting is said when the chain passes from a toothed wheel of larger diameter to a toothed wheel of smaller diameter, and upward or uphill gearshifting is said when the chain moves from a toothed wheel of smaller diameter to a toothed wheel of larger diameter. Concerning this it should be noted that with reference to the front derailleur, downward gearshifting corresponds to the passage to a lower transmission ratio and upward gearshifting corresponds to the passage to a higher transmission ratio, vice-versa with reference to the rear derailleur, downward gearshifting corresponds to the passage to a higher transmission ratio and upward gearshifting corresponds to the passage to a lower transmission ratio.

The movement in the two directions of a derailleur is obtained through an actuation device mounted on the handlebars so as to be easily manoeuvrable by the cyclist.

By convention, the actuation device of the front derailleur is situated on the left handgrip of the handlebars, and vice-versa the actuation device of the rear derailleur is located on the right handgrip.

More specifically, in a mechanical gearshift, each derailleur is moved between the toothed wheels, in a first direction by a traction action exerted by a normally sheathed inextensible cable (commonly called Bowden cable), in a second opposite direction by the release of the traction of the cable and by the elastic return action of a spring provided in the derailleur itself.

Normally, the direction in which the movement is caused by the release of the traction of the cable and by the return spring is that of a downward gearshifting; vice-versa, the traction action of the control cable takes place in the direction of an upward gearshifting, in which the chain moves from a wheel having a smaller diameter to a wheel having a larger diameter.

In the actuation device, the control cable is actuated in traction or in release through winding and unwinding on a rotor element, commonly called cable-winding bush, the rotation of which is controlled by the cyclist with a suitable control lever, or with two control levers (a first lever for the uphill gearshifting and a second lever for the downhill gearshifting).

In any case, the actuation device must provide that the cable-winding bush be held immobile in rotation in a number of predetermined angular positions, angularly spaced apart each other by predetermined indexing angles and corresponding to the different positions of the derailleur required by the different ratios, i.e. on the different toothed wheels of the gearshift. This function is obtained with the so-called indexers, many types of which are known in the art, variously active between the cable-winding bush and the fixed casing of the device.

A widely used type of indexer comprises an indexing bush that is coaxial to the cable-winding bush and is integral in rotation with it.

Typically the indexing bush comprises an externally toothed sector, with a number of teeth corresponding to the maximum number of single clicks that are needed to go from the toothed wheel with the smallest diameter to the toothed wheel with the largest diameter (or vice-versa). The teeth are angularly spaced apart each other by the predetermined indexing angles. Preferably, the teeth are angularly spaced apart each other by a same predetermined indexing angle.

On such a toothed sector a ratchet-gear mechanism is active to removably hold the cable-winding bush in the predetermined angular positions, corresponding to the different positions of the derailleur required by the different ratios.

The Applicant has found that such an actuation device can, however, be subject to the drawback of a missed upward gearshifting. In other words, although the cyclist acts correctly on the suitable control lever, the upward gearshifting is not completed, i.e. the transmission chain does not actually arrive to engage the toothed wheel having larger diameter and therefore remains on the toothed wheel on which it was located prior to the actuation of the cyclist on the control lever. In jargon, this case is also known as "refused gearshifting".

The problem at the basis of the present invention is that of making an actuation device for a control cable for a bicycle gearshift that allows the reliability of the upward gearshifting to be ensured in a simple and effective manner.

SUMMARY

The present invention relates to an actuation device for a control cable for a bicycle gearshift comprising:
  a casing, configured for fixing to bicycle handlebars;
  a cable-winding bush, on which the control cable is wound and which is angularly mobile in the casing about a main axis of the device;
  an indexing bush coaxial to the cable-winding bush and associated with it to removably hold the cable-winding bush in predetermined angular positions, angularly spaced apart each other by predetermined indexing angles;
  a manoeuvring mechanism, operative on the cable-winding bush to rotate it in a first angular direction about the main axis of the device, to obtain an upward gearshifting;

wherein, there is provided, between the cable-winding bush and the indexing bush, a coupling with a predetermined circumferential clearance corresponding to a predetermined gearshifting extra-stroke angle.

The present invention also relates to an integrated brake-gearshift actuation device of a bicycle.

BRIEF DESCRIPTION OF THE DRAWING(S)

Features and advantages of the invention will become clearer from the following description of preferred embodiments thereof, made with reference to the attached drawings. In such drawings.

DETAILED DESCRIPTION

In the description and claims hereinafter, the term "gearshifting extra-stroke" or "extra-stroke" means an additional stroke (extra-stroke indeed) to which the transmission chain is subjected with respect to the stroke geometrically necessary (which in jargon is indicated as "indexing stroke") in the gearshifting to reach the near toothed wheel, in particular the near toothed wheel of greater diameter in the case of upward gearshifting. Such an indexing stroke and such an extra-stroke are linear strokes of the transmission chain in the axial direction of the toothed wheels of the gearshift and basically correspond to (indexing and extra-stroke) angles of rotation of the cable-winding bush.

Advantageously, the coupling with a predetermined circumferential clearance, corresponding to a predetermined gearshifting extra-stroke angle, makes it possible to obtain in a simple and effective manner a desired gearshifting extra-stroke during the upward gearshifting. With such an extra-stroke, an excellent certainty of gearshifting is ensured, in the sense that the risk of refused gearshifting is eliminated or at least drastically reduced.

In particular, such an integrated brake-gearshift actuation device of a bicycle comprises an actuation device for a brake of the bicycle and the actuation device for a control cable for a gearshift of the bicycle just indicated.

The actuation device for a control cable for a bicycle gearshift and the integrated brake-gearshift actuation device of a bicycle of the present invention can comprise one or more of the following preferred features, taken individually or in combination.

Preferably, the manoeuvring mechanism comprises a first gearshift lever, which is angularly mobile with respect to the casing about the main axis of the device, in the first angular direction starting from a neutral position to obtain the upward gearshifting, in which the first gearshift lever acts on the cable-winding bush so as to:

(i) impose a first rotation of the cable-winding bush with respect to the casing and to the indexing bush in the first angular direction by the predetermined gearshifting extra-stroke angle, (ii) impose a second rotation of the cable-winding bush with respect to the casing, together with the indexing bush, in the first angular direction by the respective predetermined indexing angle, and (iii) allow a third rotation of the cable-winding bush with respect to the casing and to the indexing bush in a second angular direction opposite to the first angular direction by the predetermined gearshifting extra-stroke angle.

Preferably, elastic means are active between the first gearshift lever and the casing, in which said elastic means tend to take the first gearshift lever again into the neutral position. Such elastic means can be a simple ring-shaped torsion spring, mounted in the casing coaxially to the main axis of the device and constrained at one end to the casing and at the other end to the first lever.

Preferably, the cable-winding bush comprises a rotation pin arranged along the main axis of the device.

Advantageously, the rotation pin of the cable-winding bush can be housed in a suitable rotation seat made on the casing and can be easily connected to the first lever.

Preferably, the coupling between the cable-winding bush and the indexing bush comprises at least one protrusion, protruding in axial direction and in position eccentric from the indexing bush or from the cable-winding bush, and at least one corresponding recess, axially formed in the cable-winding bush or in the indexing bush, respectively, wherein the predetermined circumferential clearance is provided between the at least one recess and the at least one protrusion.

In an alternative that is also preferred, the coupling between the cable-winding bush and the indexing bush comprises at least one protrusion, radially protruding from the rotation pin, and at least one corresponding recess, radially formed in the indexing bush, wherein the predetermined circumferential clearance is provided between the at least one recess and the at least one protrusion.

More preferably, the aforementioned at least one protrusion and at least one recess extend along an arc of circumference having centre substantially on the main axis of the device.

In a further alternative that is also preferred, the coupling between the cable-winding bush and the indexing bush comprises a pair of axial toothings of the cable-winding bush and of the indexing bush, respectively, which mutually engage with the predetermined circumferential clearance.

In an even further alternative that is also preferred, the coupling between the cable-winding bush and the indexing bush comprises a shaped hole of the indexing bush that extends axially and a corresponding shaped portion of the rotation pin, in which the predetermined circumferential clearance is provided between the shaped hole and the shaped portion.

More preferably, the shaped portion has substantially quadrilateral cross section, with a pair of opposite sides that are substantially rectilinear and parallel.

Even more preferably, the shaped portion has the other pair of opposite sides shaped like an arc of circumference having centre substantially on the main axis of the device.

Preferably, the manoeuvring mechanism comprises a second gearshift lever, which acts on the indexing bush to allow a rotation thereof, together with the cable-winding bush, in the second angular direction about the main axis of the device, so as to obtain a downward gearshifting.

Preferably, the predetermined gearshifting extra-stroke angle is greater than zero and less than or equal to the minimum value among the predetermined indexing angles.

With reference to FIGS. 1-14 a first embodiment of actuation device for a control cable (not shown) for a gearshift of a bicycle in accordance with the present invention is shown. The actuation device is wholly indicated with 10.

Figure 1:
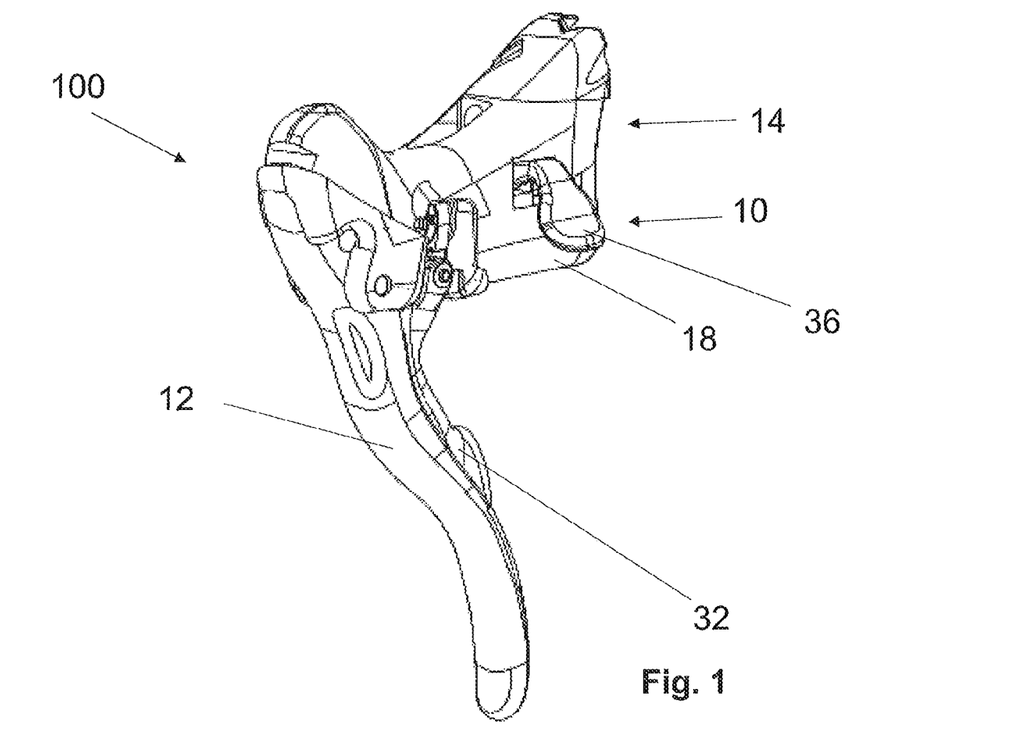
FIG. 1 is a perspective view of a first embodiment of an actuation device for a control cable for a bicycle gearshift according to the invention, in particular it concerns an integrated brake-gearshift actuation device of a bicycle.
Figure 2:
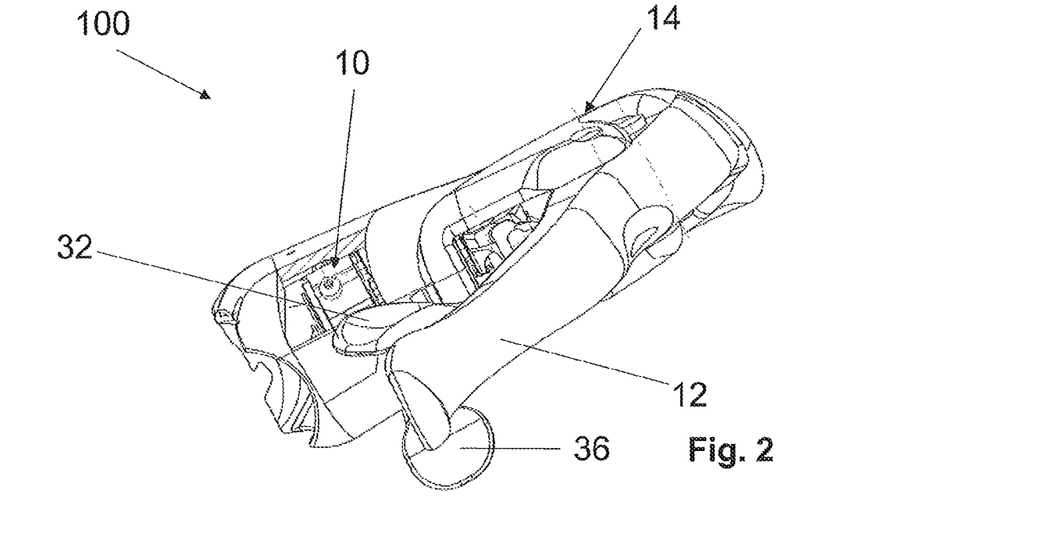
FIG. 2 is a further perspective view, partially sectioned, of the device of FIG. 1.
Figures 3, 4:
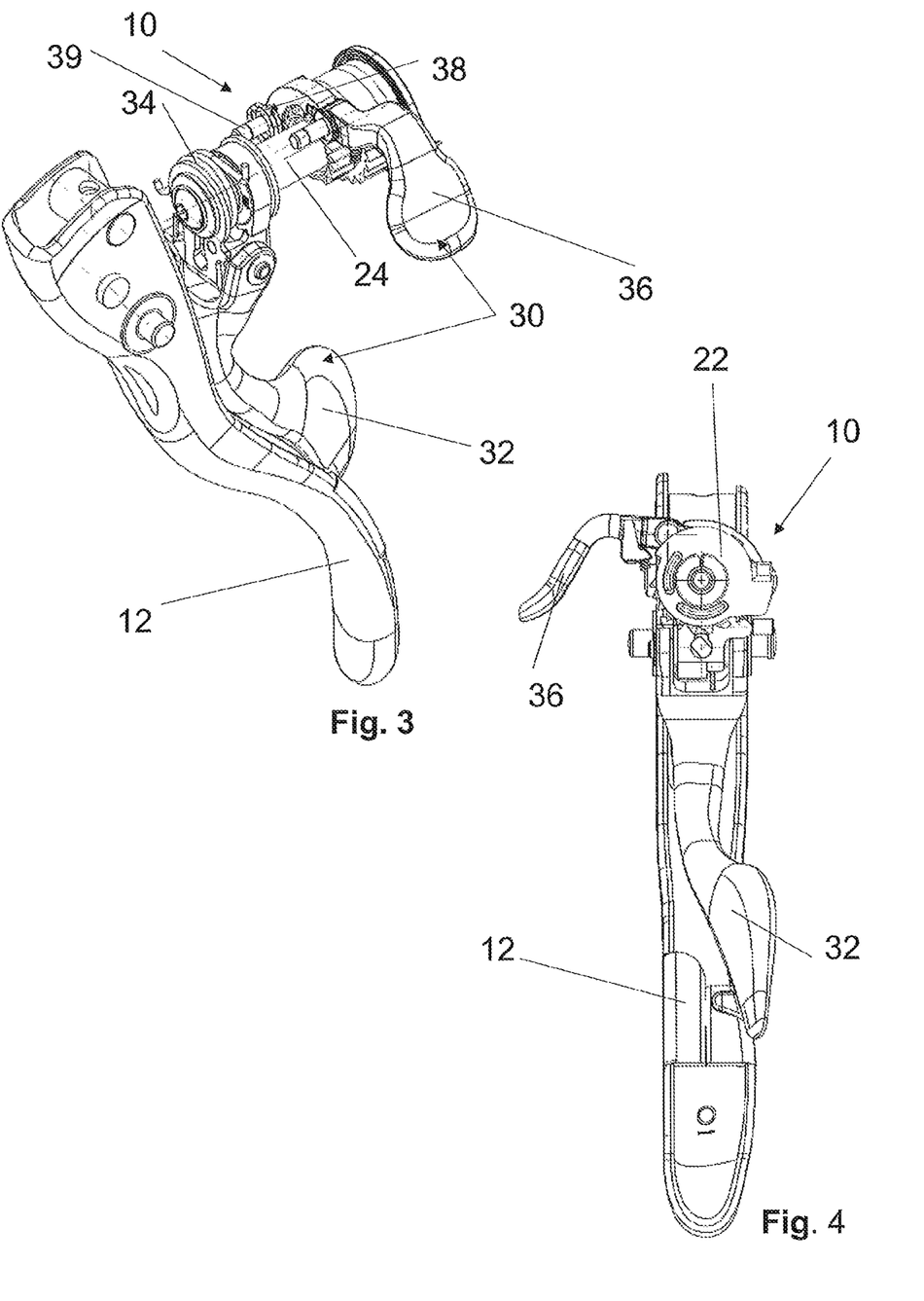
FIGS. 3 and 4 are a perspective view and a side view of part of the device of FIG. 1, without a casing of the device.
Figure 5:
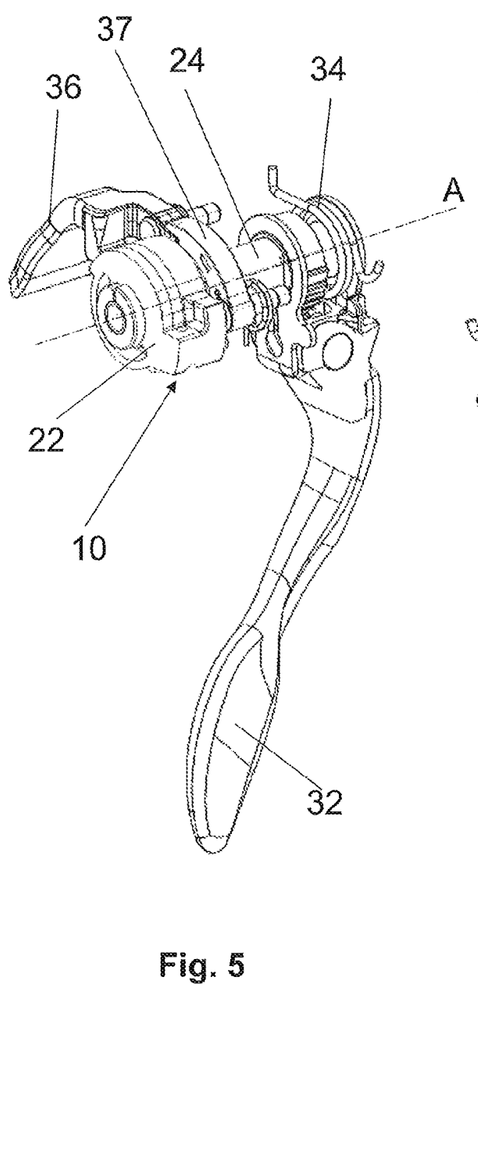
FIGS. 5 and 6 are perspective views of part of the device of FIGS. 4 and 5, without a brake lever.
Figure 6:
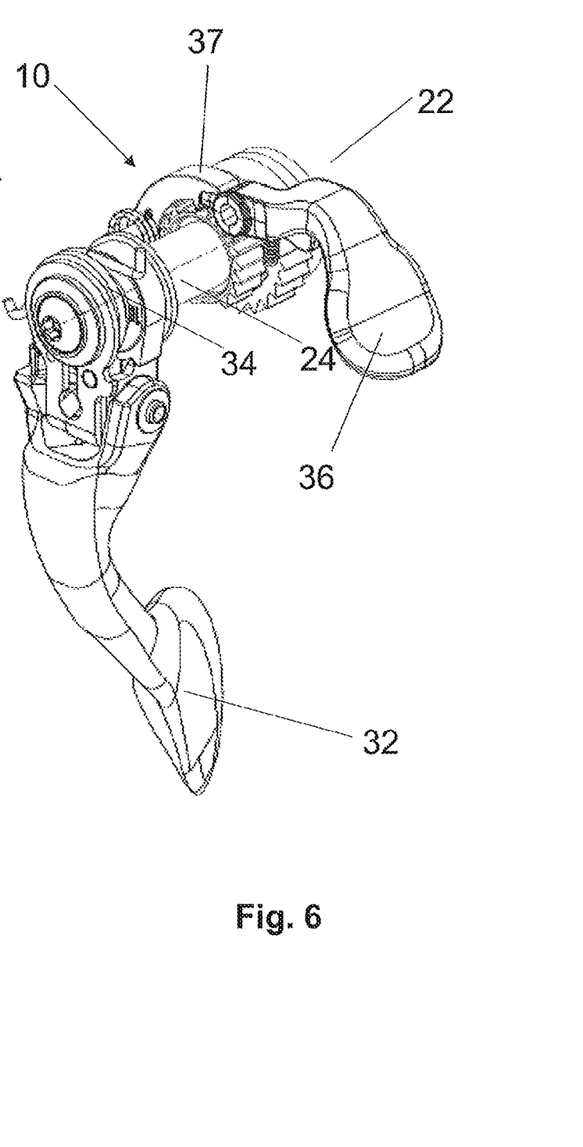

In particular, in FIGS. 1 and 2 the actuation device 10 is included in an integrated brake-gearshift actuation device 100 of the bicycle. The integrated actuation device comprises, as well as the actuation device 10, an actuation device for a brake (not shown) of the bicycle. FIGS. 1-4 show a brake lever 12 included in the actuation device for the brake.

More specifically, FIGS. 1-14 show the actuation device 10 of the control cable for the rear derailleur of the bicycle.

With particular reference to FIGS. 1 and 2, the actuation device 10 is mounted on bicycle handlebars (not shown), in particular of the type used on racing bicycles.

The actuation device 10 comprises a casing 14, which is fixed to the handlebars in conventional manner, like for example a strap 16. The casing 14 comprises a body 18 extending along an axis A of the device 10.

Figure 10:
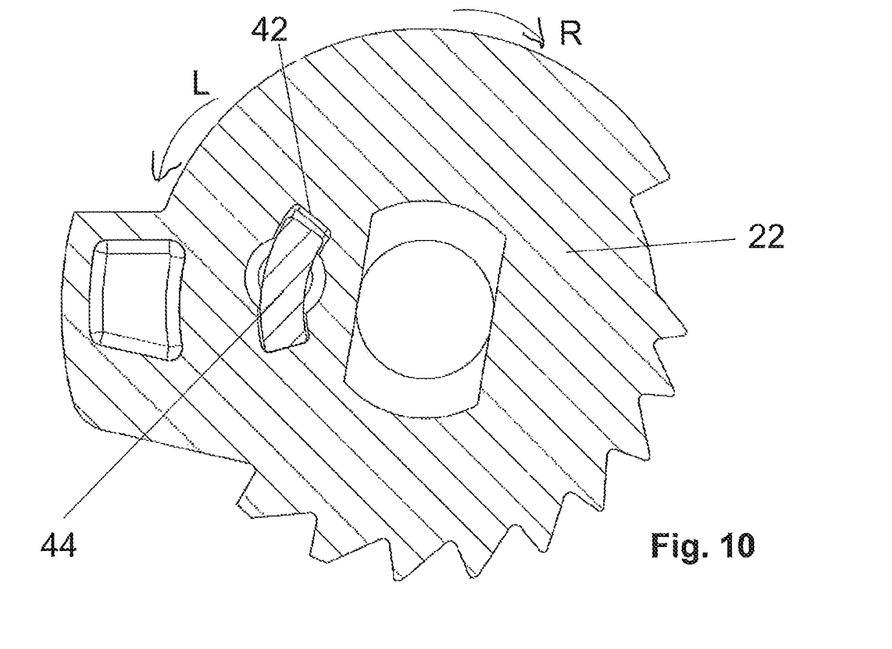

As will be clear hereafter, the main axis A is the main reference axis for the elements that are part of the device 10; all of the indications of direction and the like, such as "axial", "radial", "circumferential", "diametral" and the like will refer with respect to it; equally, the indications "outwards" and "inwards" referring to radial directions should be understood as away from the axis A or towards the axis A. Two opposite angular directions are also defined about the axis A, indicated with R and L, the first in the clockwise direction, the second in the anti-clockwise direction, observing the device 10 as represented in FIG. 10.

The device 10 comprises a cable-winding bush 22, to which the control cable is fixed and on which it is wound. The cable-winding bush 22 is mounted in the body 18 of the casing 14 and is angularly mobile about the axis A.

The cable-winding bush 22 comprises a rotation pin 24 arranged along the axis A. The rotation pin 24 is integral with the cable-winding bush 22.

The rotation pin 24 is housed in a suitable rotation seat (not shown) made in the body 18 of the casing 14.

The device 10 also comprises an indexing bush 26 that is coaxial to the cable-winding bush 22 and that is associated with it to removably hold the cable-winding bush 22 in predetermined angular positions with respect to the casing 14, according to the selected transmission ratio of the gearshift. Such angular positions are angularly spaced apart each other by predetermined indexing angles α and are defined on the indexing bush 26 by a plurality of corresponding teeth 27 made on a radially outer toothed sector 27a of the indexing bush 26 (see in particular FIG. 7). Preferably, the teeth 27 are angularly spaced apart each other by a same predetermined indexing angle α.

The device 10 also comprises a manoeuvring mechanism, to obtain upward or downward gearshifting, wholly indicated with 30, operative on the cable-winding bush 22 to rotate it in the angular directions R and L about the axis A.

The manoeuvring mechanism 30 comprises a first gearshift lever 32, which is angularly mobile with respect to the casing 14 about the axis A, in the angular direction R starting from a neutral position to obtain the upward gearshifting.

The first gearshift lever 32 is connected to the rotation pin 24 of the cable-winding bush 22.

Elastic means 34 are active between the first gearshift lever 32 and the casing 14, and such elastic means 34 tend to take the first gearshift lever 32 again into the neutral position.

In the non-limiting example illustrated, such elastic means are a ring-shaped torsion spring 34 (see FIGS. 3, 5 and 6), mounted in the casing 14 coaxially to the axis A and constrained at one end to the casing 14 and at the other end to the first gearshift lever 32.

The connection between first gearshift lever 32 and rotation pin 24 is per se conventional and therefore will not be described in detail hereafter.

The manoeuvring mechanism 30 comprises a second gearshift lever 36, which acts on the indexing bush 26 to allow a rotation thereof, together with the cable-winding bush 22, in the angular direction L about the axis A, so as to obtain a downward gearshifting.

Figure 7:
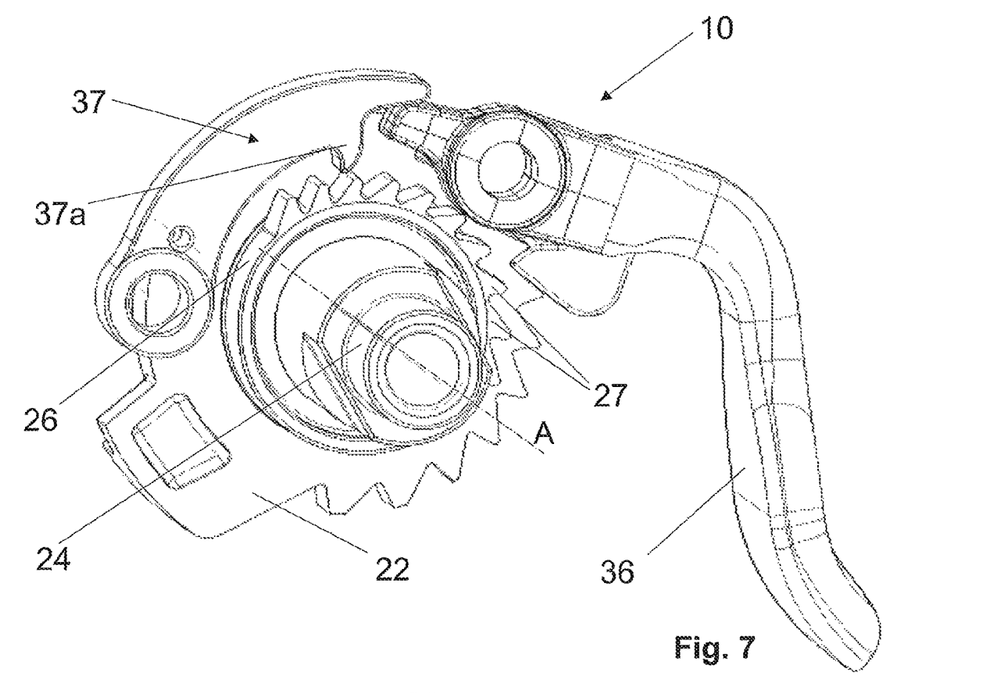
FIG. 7 is a perspective view of part of the device of FIGS. 5 and 6, without a first gearshift lever.
Figure 8:
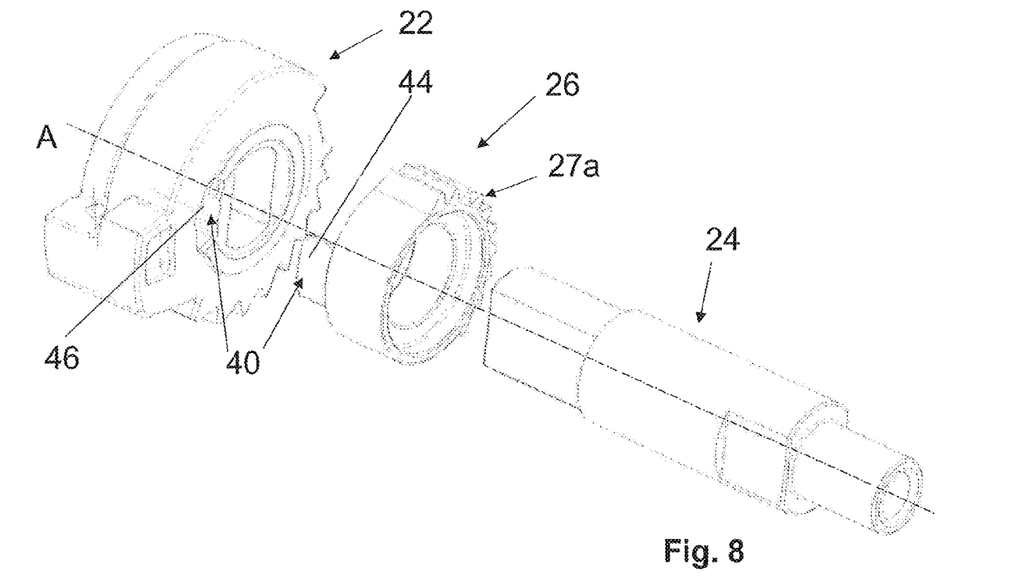
FIG. 8 is an exploded perspective view of part of the device of FIG. 7, without a second gearshift lever.
Figure 9:
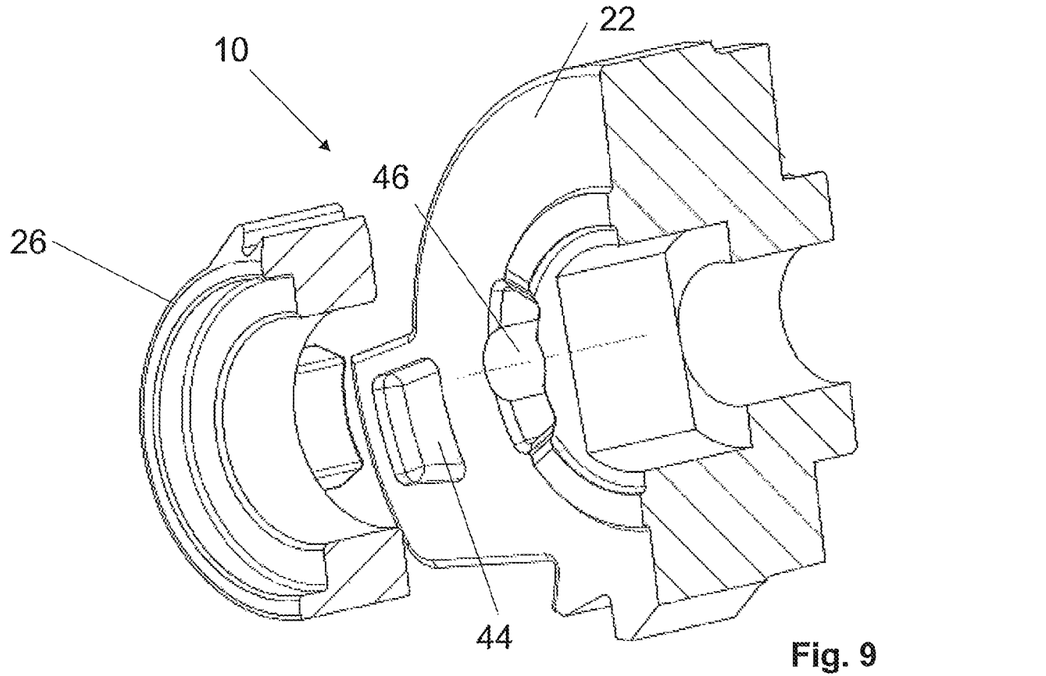
FIGS. 9 and 10 are a cutaway perspective view and a cross section view—according to a plane perpendicular to the main axis of the device—of part of the device of FIG. 8, in particular of a cable-winding bush and of an indexing bush.

As shown in FIG. 7, the second gearshift lever 36 acts on a rocker 37 hinged on a pin 39 integral with the cable-winding bush 22. The rocker 37 comprises a pawl 37a that acts on the teeth 27 of the toothed sector 27a of the indexing bush 26.

In particular, by actuating the second gearshift lever 36, the rocker 37 is moved away from the toothed sector 27a, so that the pawl 37a disengages from a tooth 27. Once downward gearshifting has occurred, the rocker 37 goes back towards the toothed sector 27a through the effect of elastic means 38, for example a torsion spring (for example arranged at such a pin 39), and the pawl 37a locks the next tooth 27 in the angular direction L with respect to that which it has previously disengaged.

The downward gearshifting mechanism that uses the assembly of second gearshift lever 36, rocker 37, pawl 37a and toothed sector 27a is of the conventional type and is not specified any further.

In accordance with a characterising aspect of the invention, between the cable-winding bush 22 and the indexing bush 26 it is provided a coupling 40 with a predetermined circumferential clearance 42, corresponding to a predetermined gearshifting extra-stroke angle β.

The coupling 40 makes it possible to obtain the desired gearshifting extra-stroke during the upward gearshifting, obtained by actuating the first gearshift lever 32.

Figure 13:
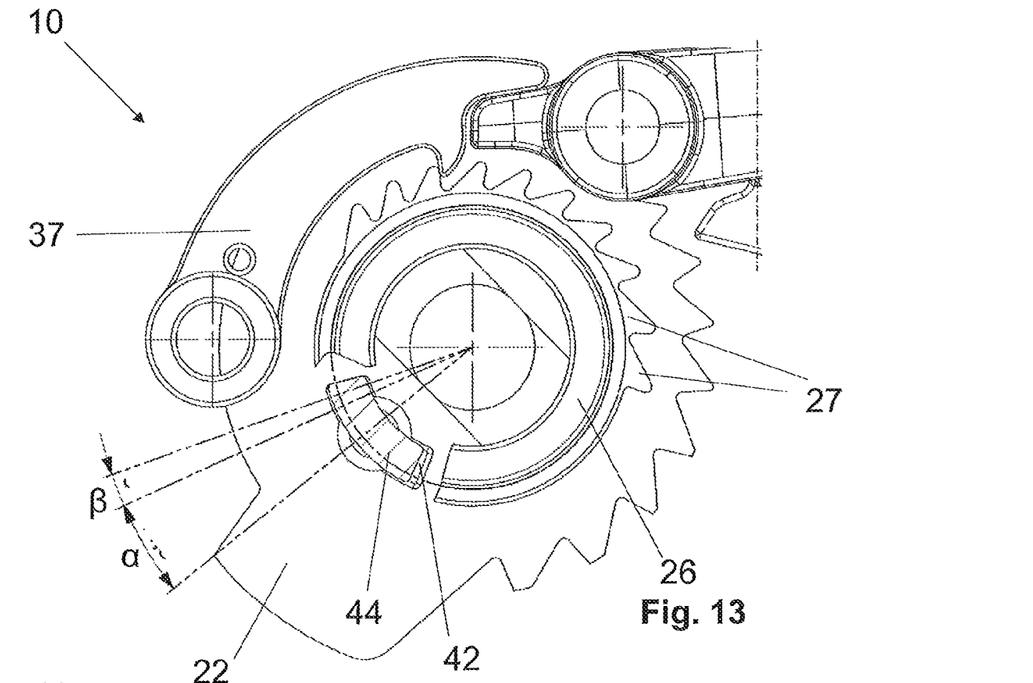
Figure 14:
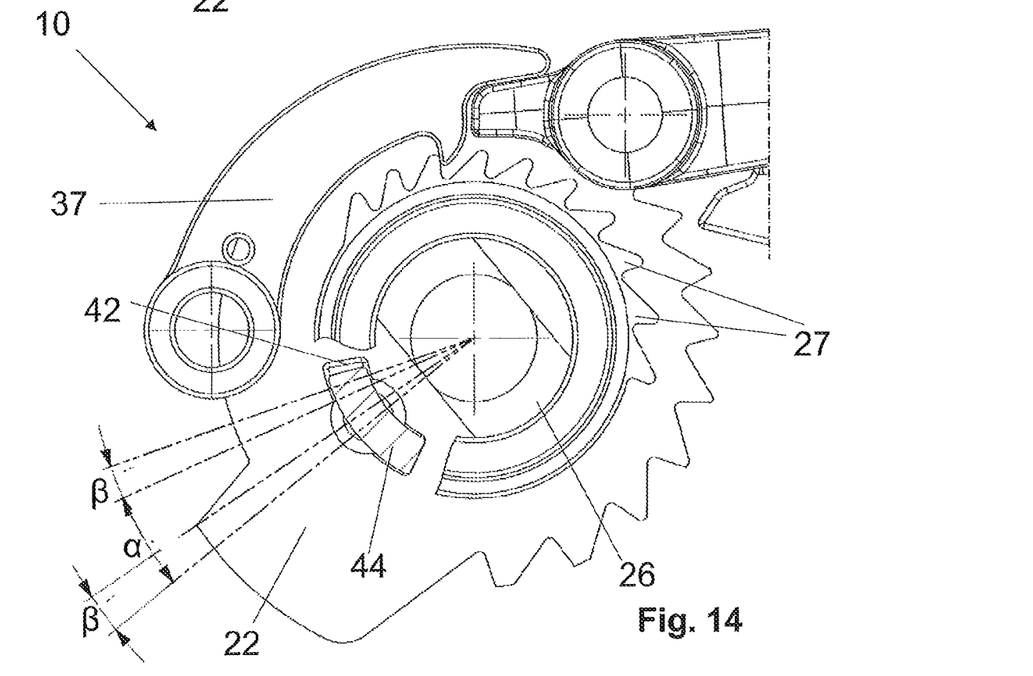

In particular, with reference to FIGS. 11-14, the first gearshift lever 32 acts on the cable-winding bush 22 so as to:

(i) impose a first rotation of the cable-winding bush 22 with respect to the casing 14 and to the indexing bush 26 in the angular direction R by the predetermined gearshifting extra-stroke angle β (FIG. 12), (ii) impose a second rotation of the cable-winding bush 22 with respect to the casing 14, together with the indexing bush 26, in the angular direction R by the respective predetermined indexing angle α (FIG. 13), and (iii) allow a third rotation of the cable-winding bush 22 with respect to the casing 14 and to the indexing bush 26 in the angular direction L—opposite to the angular direction R—by the predetermined gearshifting extra-stroke angle β (FIG. 14).

As shown in FIGS. 8-14, the coupling 40 between the cable-winding bush 22 and the indexing bush 26 comprises a protrusion 44, protruding in axial direction and in position eccentric from the cable-winding bush 22, and a corresponding recess 46, axially formed in the indexing bush 26. The predetermined circumferential clearance 42 is provided between the recess 46 and the protrusion 44.

Figure 15:
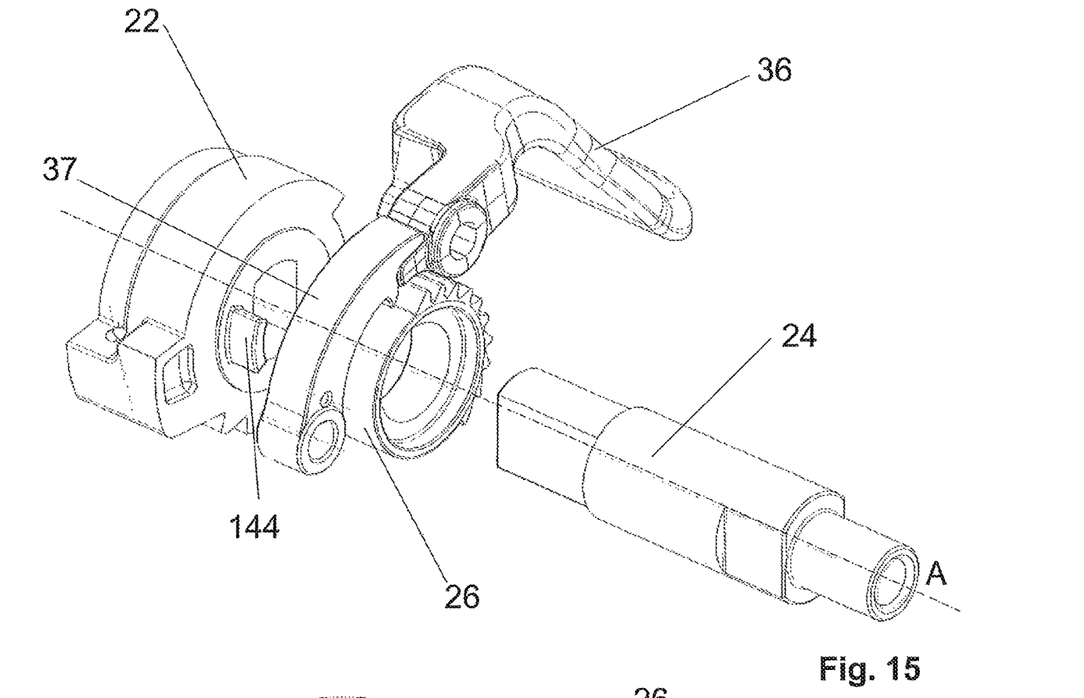
FIG. 15 is an exploded perspective view (analogous to FIG. 8) of part of a second embodiment of an actuation device for a control cable for a bicycle gearshift according to the invention.
Figure 15A:
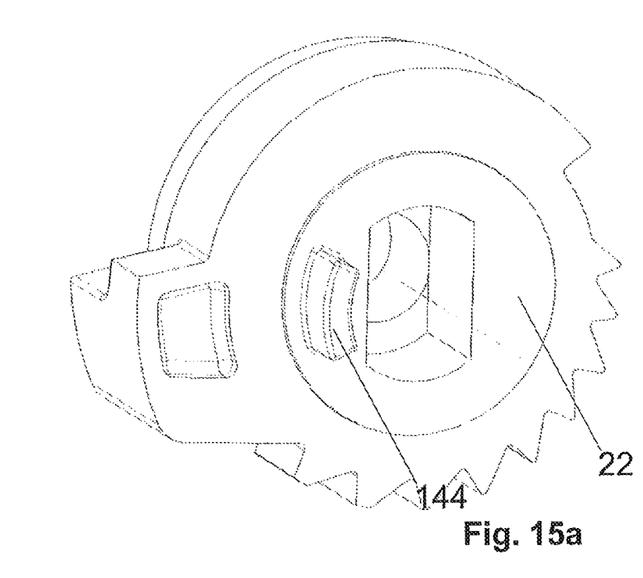
FIGS. 15a and 15b are perspective views of part of the device of FIG. 15, in particular of a cable-winding bush and of an indexing bush.
Figure 15B:
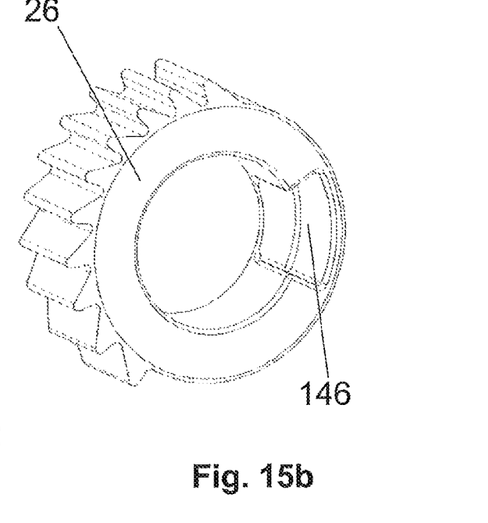

FIGS. 15, 15a and 15b show a second embodiment of the actuation device 10 according to the invention. In such Figures, structural elements that are identical or equivalent from the functional point of view to those of the first embodiment of the device 10 of the invention (FIGS. 1-14) will be attributed the same reference numerals and they will not be described any further.

In particular, the second embodiment of the device 10 differs from the first embodiment of the device 10 in that the coupling 40 between the cable-winding bush 22 and the indexing bush 26 comprises a protrusion 144, protruding in axial direction and in position eccentric from the cable-winding bush 22, and a corresponding recess 146, axially formed in the indexing bush 26. The predetermined circumferential clearance 42 is provide between the recess 146 and the protrusion 144.

Figures 16, 16A, 16B:
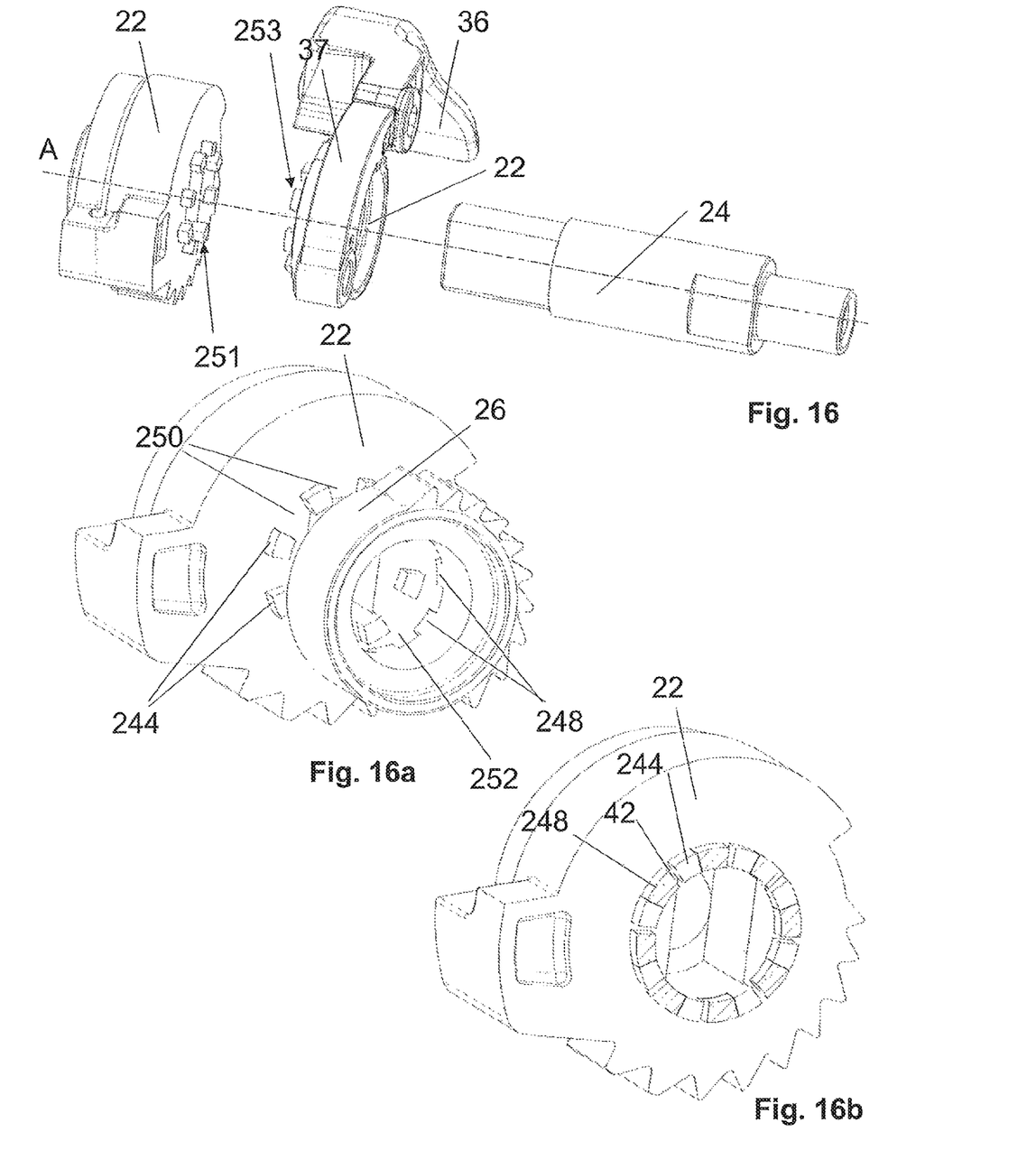
FIG. 16 is an exploded perspective view (analogous to FIG. 15) of part of a third embodiment of an actuation device for a control cable for a bicycle gearshift according to the invention.
FIGS. 16a and 16b are perspective views of part of the device of FIG. 16, in particular of a cable-winding bush and of an indexing bush, exploded (FIG. 16a) and in cross section according to a plane perpendicular to the main axis of the device (FIG. 16b)

FIGS. 16, 16a and 16b show a third embodiment of the actuation device 10 according to the invention. In such Figures, structural elements that are identical or equivalent from the functional point of view to those of the first embodiment of the device 10 of the invention (FIGS. 1-14) will be attributed the same reference numerals and they will not be described any further.

In particular, the third embodiment of the device 10 differs from the first embodiment of the device 10 in that the coupling 40 between the cable-winding bush 22 and the indexing bush 26 comprises a plurality of protrusions 244, protruding in axial direction and in a same position eccentric from the cable-winding bush 22, and a plurality of protrusions 248, protruding in axial direction and in a same position eccentric from the indexing bush 26.

A plurality of insertion spaces 250 for the protrusions 248 are defined between the protrusions 244, just as a plurality of insertion spaces 252 for the protrusions 244 are defined between the protrusions 248. The insertion spaces 250, 252 have a greater circumferential extension than that of the respective protrusions 248, 244, in such a way that the predetermined circumferential clearance 42 is provided between the cable-winding bush 22 and the indexing bush 26.

Preferably, all of the protrusions 244 (and all of the corresponding insertion spaces 252) have equal circumferential extension, just as all of the protrusions 248 (and all of the corresponding insertion spaces 250) have equal circumferential extension.

More preferably, all of the protrusions 244 have an equal circumferential extension that is equivalent to the equal circumferential extension of all of the protrusions 248, just as all of the insertion spaces 252 have an equal circumferential extension that is equivalent to the equal circumferential extension of all of the insertion spaces 250.

Basically, the protrusions 244 with the insertion spaces 250 and the protrusions 248 with the insertion spaces 252 define a pair of axial toothings 251, 253 of the cable-winding bush 22 and of the indexing bush 26, respectively, which engage with each other with the predetermined circumferential clearance 42.

In a variant that is not illustrated, the insertion spaces 250, 252 are axially formed, at least partially, in the cable-winding bush 22 and in the indexing bush 26, respectively. In this case they become, in practice, receiving seats for at least part of the protrusions 248 and 244, respectively.

Figure 17:
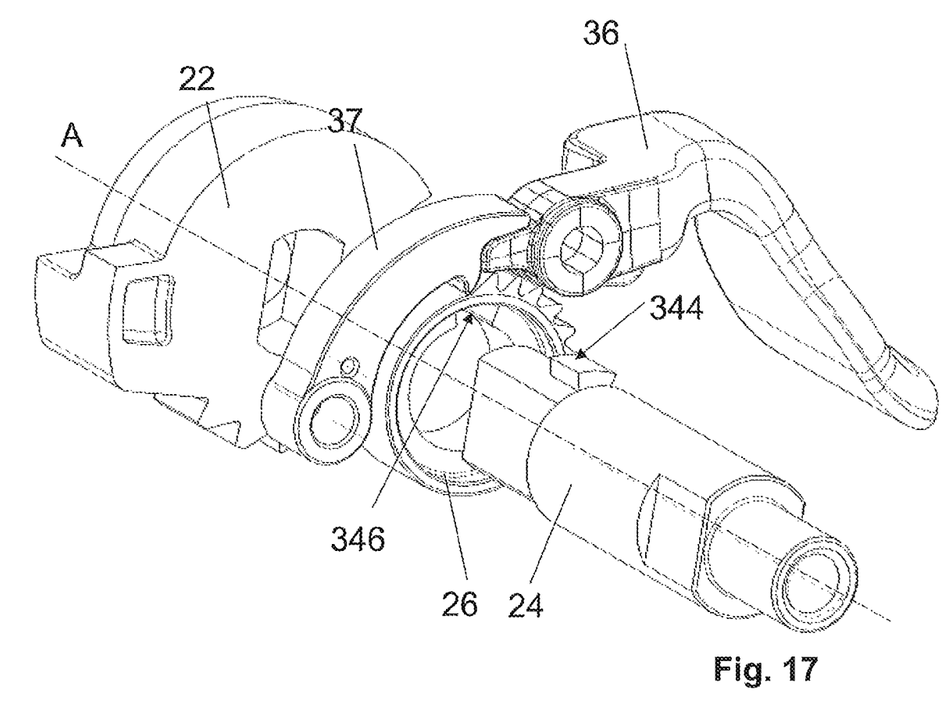
FIG. 17 is an exploded perspective view (analogous to FIG. 16) of part of a fourth embodiment of an actuation device for a control cable for a bicycle gearshift according to the invention.
Figure 17A:
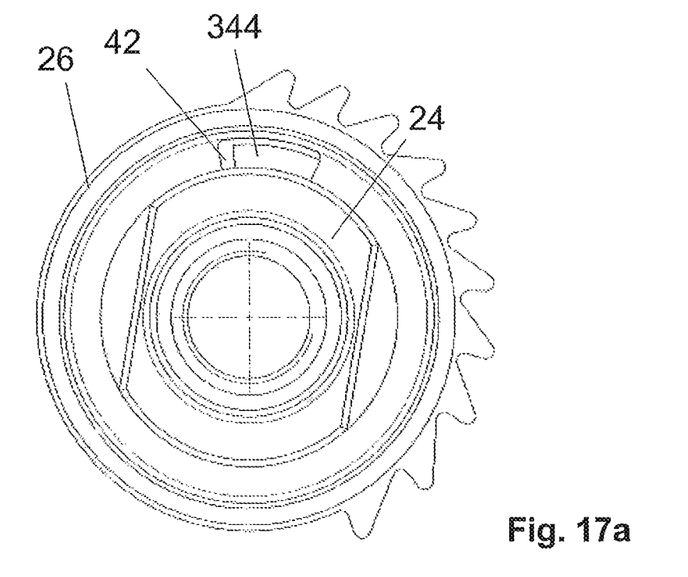
FIG. 17a is a side view of part of the device of FIG. 17, in particular of the assembly of indexing bush and rotation pin.

FIGS. 17 and 17a show a fourth embodiment of the actuation device 10 according to the invention. In such Figures, structural elements that are identical or equivalent from the functional point of view to those of the first embodiment of the device 10 of the invention (FIGS. 1-14) will be attributed the same reference numerals and they will not be described any further.

In particular, the fourth embodiment of the device 10 differs from the first embodiment of the device 10 in that the coupling 40 between the cable-winding bush 22 and the indexing bush 26 comprises a protrusion 344, radially protruding from the rotation pin 24, and a corresponding recess 346, radially formed in the indexing bush 26. The predetermined circumferential clearance 42 is provided between the recess 346 and the protrusion 344. It is worth repeating that the rotation pin 24 is integral with the cable-winding bush 22.

The protrusion 344 and the recess 346 extend along an arc of circumference having centre substantially on the axis A.

In a variant that is not illustrated, the coupling 40 between the cable-winding bush 22 and the indexing bush 26 comprises a protrusion, radially protruding from a substantially circular hole of the indexing bush 26 (at least one portion of the rotation pin being inserted into such a hole), and a corresponding recess, radially formed in the rotation pin 24. The predetermined circumferential clearance is provided between the aforementioned recess and the aforementioned protrusion.

FIGS. 18 and 18a-18c show a fifth embodiment of the actuation device 10 according to the invention. In such Figures, structural elements that are identical or equivalent from the functional point of view to those of the first embodiment of the device 10 of the invention (FIGS. 1-14) will be attributed the same reference numerals and they will not be described any further.

In particular, the fifth embodiment of the device 10 differs from the first embodiment of the device 10 in that the coupling 40 between the cable-winding bush 22 and the indexing bush 26 comprises a shaped hole 454 of the indexing bush 26 that extends axially and a corresponding shaped portion 456 of the rotation pin 24, in which the predetermined circumferential clearance 42 is provided between the shaped hole 454 and the shaped portion 456.

Figures 18, 18A, 18B, 18C:
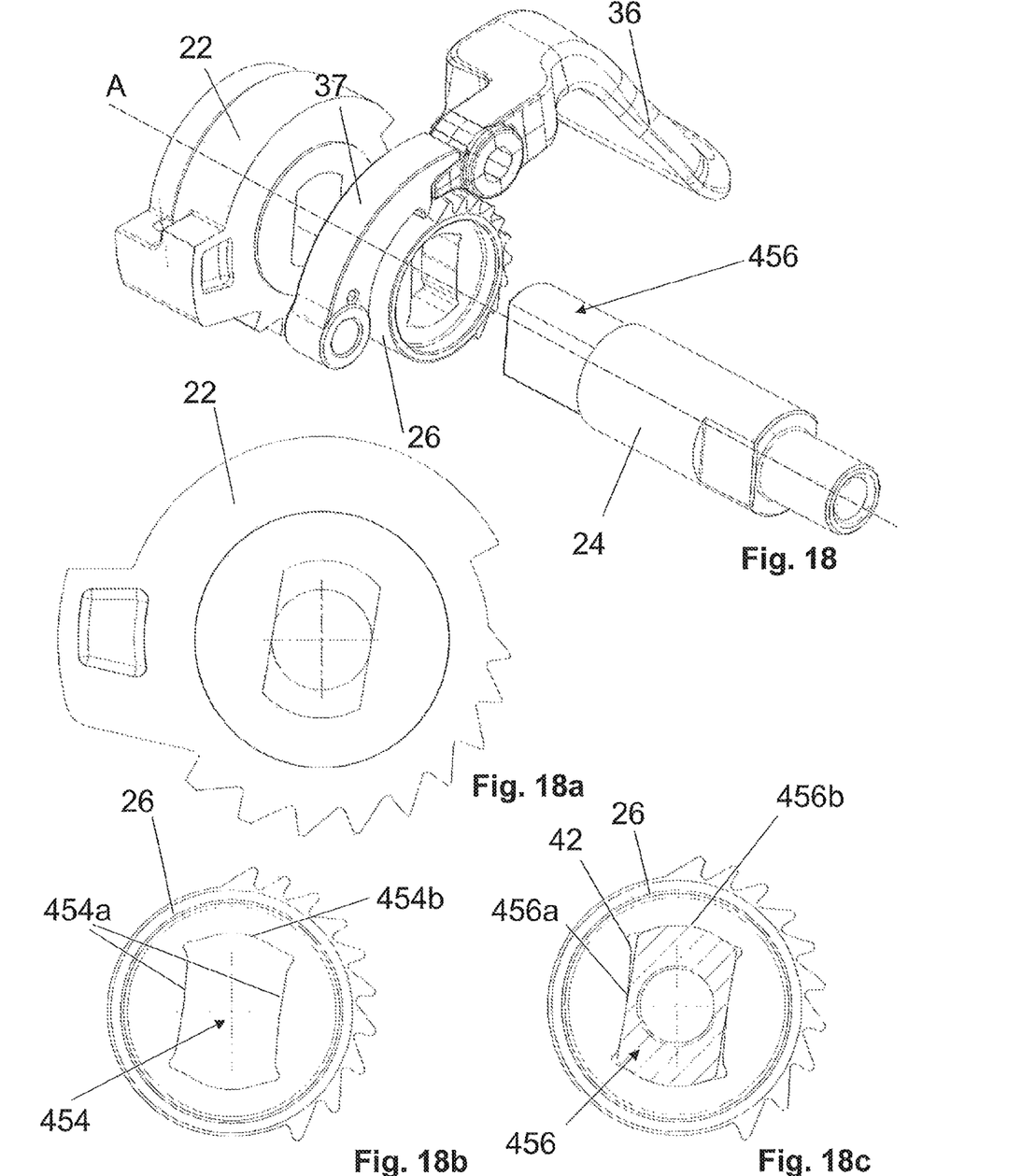
FIG. 18 is an exploded perspective view (analogous to FIG. 17) of part of a fifth embodiment of an actuation device for a control cable for a bicycle gearshift according to the invention.
FIGS. 18a, 18b and 18c are side views of part of the device of FIG. 18, in particular of a cable-winding bush (FIG. 18a), of an indexing bush (FIG. 18b) and of the assembly of indexing bush and rotation pin (FIG. 18c).

As shown in particular in FIG. 18c, the shaped portion 456 has substantially quadrilateral cross section, with a pair of opposite sides 456a that are substantially rectilinear and parallel. The other pair of opposite sides 456b of the shaped portion 456 is shaped like an arc of circumference having centre substantially on the axis A.

As shown in particular in FIGS. 18b and 18c, the shaped hole 454 has substantially quadrilateral cross section, with a pair of opposite sides 454a that cooperate with clearance with the pair of opposite sides 456a of the shaped portion 456 (so as to allow a relative rotation between shaped portion 456 and shaped hole 454, which corresponds to the predetermined circumferential clearance 42). The other pair of opposite sides 454b of the shaped hole 454 is shaped like an arc of circumference having centre substantially on the axis A and slidingly cooperates with the pair of opposite sides 456b of the shaped portion 456.

The operation of the actuation device 10 according to the invention is already clear from the above and is totally analogous for all of the embodiments and variants described. It is further specified hereafter, in reference to the first embodiment (FIGS. 11-14), that of the other embodiments and variants being totally analogous.

As a result of the coupling 40 with the predetermined circumferential clearance 42, the following steps of the actuation device 10 are achieved.

Figure 12:
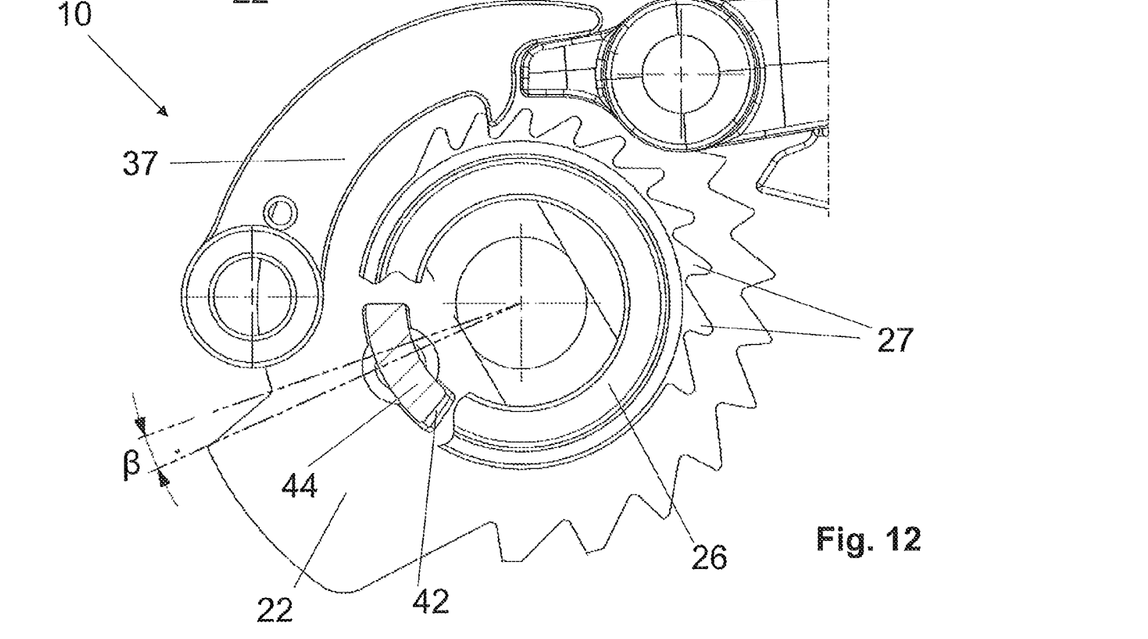

In a first actuation step of the first gearshift lever 32, the cable-winding bush 22 rotates by the predetermined gearshifting extra-stroke angle β whereas the indexing bush 26 stays immobile (with respect to the casing 14) thanks to the predetermined circumferential clearance 42 of the coupling 40 (FIG. 12).

Thereafter, the protrusion 44 goes into abutment in the recess 46 so that the cable-winding bush 22 pulls the indexing bush 26 by an angular stroke equal to the respective predetermined indexing angle α (FIG. 13).

The transmission chain follows the cable-winding bush 22 and thus so far it has already travelled an extra space (extra-stroke) with respect to the indexing stroke, i.e. corresponding to the angular stroke corresponding to the gearshifting extra-stroke angle β added to the respective indexing angle α. In other words the transmission chain is not in a position of ordinary engagement of the next larger toothed wheel, but further forward (extra-stroke) by a distance corresponding to the gearshifting extra-stroke angle β.

Thereafter, there is the release of the first gearshift lever 32 and the cable-winding bush 22 goes back by the gearshifting extra-stroke angle β, whereas the indexing bush 26 stays immobile (with respect to the casing 14) again thanks to the predetermined circumferential clearance between protrusion 44 and recess 46 (FIG. 14).

In this way, the transmission chain, which follows the rotation of the cable-winding bush 22, after having been in extra-stroke position during the gearshifting (FIG. 13), goes back by a stroke corresponding to the gearshifting extra-stroke angle β up to the position of ordinary engagement of the next larger toothed wheel.

Therefore, due to the coupling 40 with the predetermined circumferential clearance 42, an excellent reliability of the upward gearshifting is obtained in simple and effective manner, ensuring that the transmission chain that must engage the next larger toothed wheel moves by an extra-stroke with respect to the only indexing stroke, which is then recovered at the end of gearshifting, so that the transmission chain remains exactly in the engagement position of the larger toothed wheel (indexing position).

Basically, in the aforementioned three steps, the cable-winding bush 22 carries out a first rotation in the angular direction R by the predetermined gearshifting extra-stroke angle β (FIG. 12), then carries out a second rotation in the angular direction R by the respective predetermined indexing angle α (FIG. 13), and finally carries out a third rotation in the angular direction L by the predetermined gearshifting extra-stroke angle β (FIG. 14).

Figure 11:
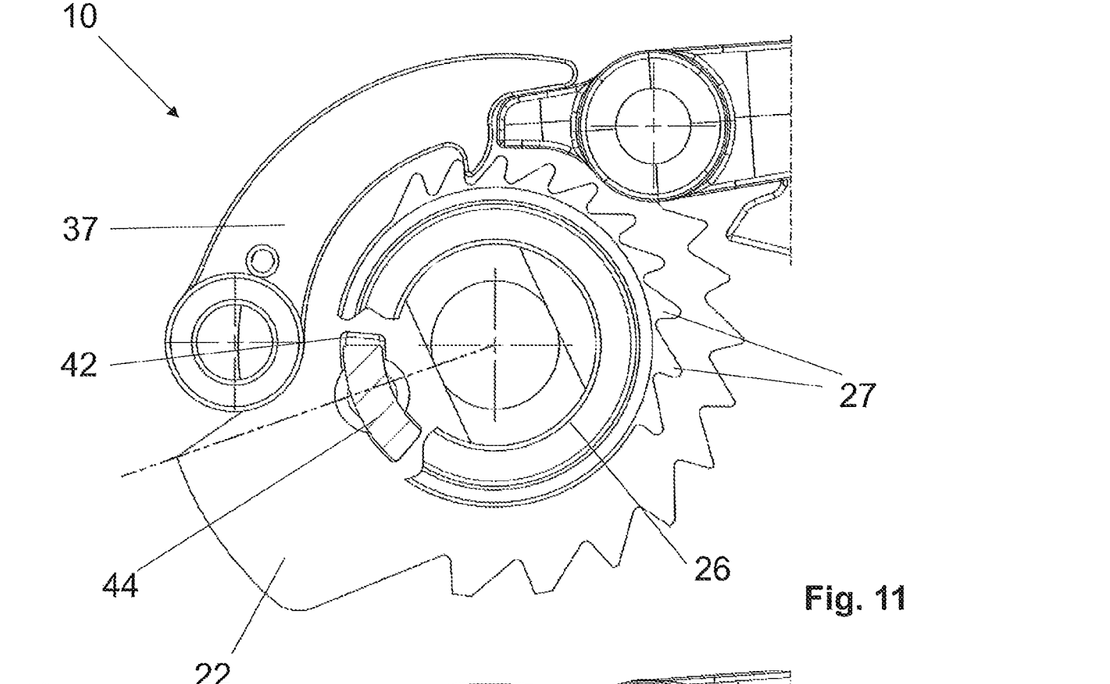
FIGS. 11-14 are side and partially sectioned views (according to a plane perpendicular to the main axis of the device) of the device of FIG. 7, which show successive positions during the operation of the device, in particular during an upward gearshifting.

It should be observed that, once the upward gearshifting has occurred, the pawl 37a of the rocker 37 locks the tooth 27 (of the toothed sector 27a of the indexing bush 26) that is next in the angular direction R with respect to that at which it was engaged before the gearshifting that had disengaged before (in FIGS. 11 and 12 the pawl 27 engages the second tooth 27, whereas in FIGS. 13 and 14 the pawl 37a engages the third tooth 27, i.e. the next tooth in the angular direction R). The passage of the pawl 37a between the two teeth 27 is carried out substantially automatically thanks to the asymmetric shape (substantially saw tooth) of the profile of the teeth 27 themselves and of the pawl 37a (as well as by the elastic means 38 that pull back the rocker 37 towards the toothed sector 27a). Such passage is of conventional type and is not specified any further.

Preferably, the predetermined gearshifting extra-stroke angle β is greater than zero and less than or equal to the minimum value among the predetermined indexing angles α. For example, in the case of an indexing angle of 13.6° the gearshifting extra-stroke angle can be of 5°.

Of course, those skilled in the art can bring numerous modifications and variants to the invention described above in order to satisfy specific and contingent requirements, all of which are in any case encompassed by the scope of protection as defined by the following claims

What is claimed is:

1. An integrated brake-gearshift actuation device of a bicycle, comprising an actuation device for a bicycle brake and an actuation device for a control cable for a bicycle gearshift, the actuation device for a control cable comprising:

a casing configured for mounting on a bicycle handlebar;
a cable-winding bush that is contained in the casing and is angularly mobile about a main axis (A);
an indexing bush that is coaxial with the cable-winding bush and holds the cable-winding bush in predetermined angularly spaced positions having predetermined indexing angles (α) that correspond to specific positions of a transmission chain relative to toothed wheels;
a control lever that rotates the cable-winding bush in a first angular direction about the main axis (A) to obtain an upward gearshift; and,
a coupling that mates the cable-winding bush and the indexing bush and has a predetermined circumferential clearance between the cable-winding bush and the indexing bush which corresponds to a predetermined gearshifting extra-stroke angle (β) that is less than a minimum angle of the predetermined indexing angles (α), the lever comprises at least a first gearshift lever, which is angularly mobile with respect to the casing about the main axis (A) of the device, in the first angular direction starting from a neutral position to obtain the upward gearshifting, and the first gearshift lever acts on the cable-winding bush to:

(i) impose a first rotation of the cable-winding bush with respect to the casing and to the indexing bush in the first angular direction by the predetermined gearshifting extra-stroke angle (β);

(ii) impose a second rotation of the cable-winding bush with respect to the casing, together with the indexing bush, in the first angular direction by the respective predetermined indexing angle (α); and, (iii) impose a third rotation of the cable-winding bush with respect to the casing and to the indexing bush in a second angular direction opposite to the first angular direction by the predetermined gearshifting extra-stroke angle (β), and the lever comprises a second gearshift lever, which causes the indexing bush to rotate together with the cable-winding bush, in a second angular direction about the main axis (A) of the device, so as to obtain a downward gearshifting, wherein:

the cable-winding bush comprises a rotation pin arranged along the main axis (A) of the device; and the coupling between the cable-winding bush and the indexing bush comprises at least one protrusion, protruding radially from the rotation pin, and at least one corresponding recess, formed radially in the indexing bush, wherein the predetermined circumferential clearance is provided between the at least one recess and the at least one protrusion.

2. The device according to claim 1, wherein a biasing means between the first gearshift lever and the casing biases the first gearshift lever toward the neutral position.

3. The device according to claim 1, wherein the predetermined gearshifting extra-stroke angle (β) is greater than zero and less than or equal to the minimum angle of the predetermined indexing angles (α).

4. The device according to claim 1, wherein the at least one protrusion and the at least one recess extend along an arc of circumference having centre substantially on the main axis (A) of the device.

5. The device according to claim 1, wherein the predetermined gearshifting extra-stroke angle (β) is less than half of the minimum angle of the predetermined indexing angles (α).

6. The device according to claim 1, wherein the predetermined gearshifting extra-stroke angle (β) is between 1%-50% of the minimum angle of the predetermined indexing angles (α).

7. An integrated brake-gearshift actuation device of a bicycle, comprising an actuation device for a bicycle brake and an actuation device for a control cable for a bicycle gearshift, the actuation device for a control cable comprising:

a casing configured for mounting on a bicycle handlebar;

a cable-winding bush that is contained in the casing and is angularly mobile about a main axis (A);

an indexing bush that is coaxial with the cable-winding bush and holds the cable-winding bush in predetermined angularly spaced positions having predetermined indexing angles (α) that correspond to specific positions of a transmission chain relative to toothed wheels;

a control lever that rotates the cable-winding bush in a first angular direction about the main axis (A) to obtain an upward gearshift; and, a coupling that mates the cable-winding bush and the indexing bush and has a predetermined circumferential clearance between the cable-winding bush and the indexing bush which corresponds to a predetermined gearshifting extra-stroke angle (β) that is less than a minimum angle of the predetermined indexing angles (α), the lever comprises at least a first gearshift lever, which is angularly mobile with respect to the casing about the main axis (A) of the device, in the first angular direction starting from a neutral position to obtain the upward gearshifting, and the first gearshift lever acts on the cable-winding bush to:

(i) impose a first rotation of the cable-winding bush with respect to the casing and to the indexing bush in the first angular direction by the predetermined gearshifting extra-stroke angle (β);

(ii) impose a second rotation of the cable-winding bush with respect to the casing, together with the indexing bush, in the first angular direction by the respective predetermined indexing angle (α); and, (iii) impose a third rotation of the cable-winding bush with respect to the casing and to the indexing bush in a second angular direction opposite to the first angular direction by the predetermined gearshifting extra-stroke angle (β), and the lever comprises a second gearshift lever, which causes the indexing bush to rotate together with the cable-winding bush, in a second angular direction about the main axis (A) of the device, so as to obtain a downward gearshifting, wherein:

the cable-winding bush comprises a rotation pin arranged along the main axis (A) of the device; and wherein the coupling between the cable-winding bush and the indexing bush comprises a shaped hole of the indexing bush that extends axially and a corresponding shaped portion of the rotation pin, wherein the predetermined circumferential clearance is provided between the shaped hole and the shaped portion.

8. The device according to claim 7, wherein the shaped portion has substantially quadrilateral cross section, with a pair of opposite sides that are substantially rectilinear and parallel.

9. The device according to claim 8, wherein the shaped portion has the other pair of opposite sides shaped like an arc of circumference having centre substantially on the main axis (A) of the device.

* * * * *